Oct. 4, 1960  O. W. SCOTT  2,954,831
VARIABLE PITCH PROPELLER
Filed Dec. 11, 1958  2 Sheets-Sheet 1

INVENTOR.
ORIN W. SCOTT
BY
*Philip D. McLean*
ATTORNEY

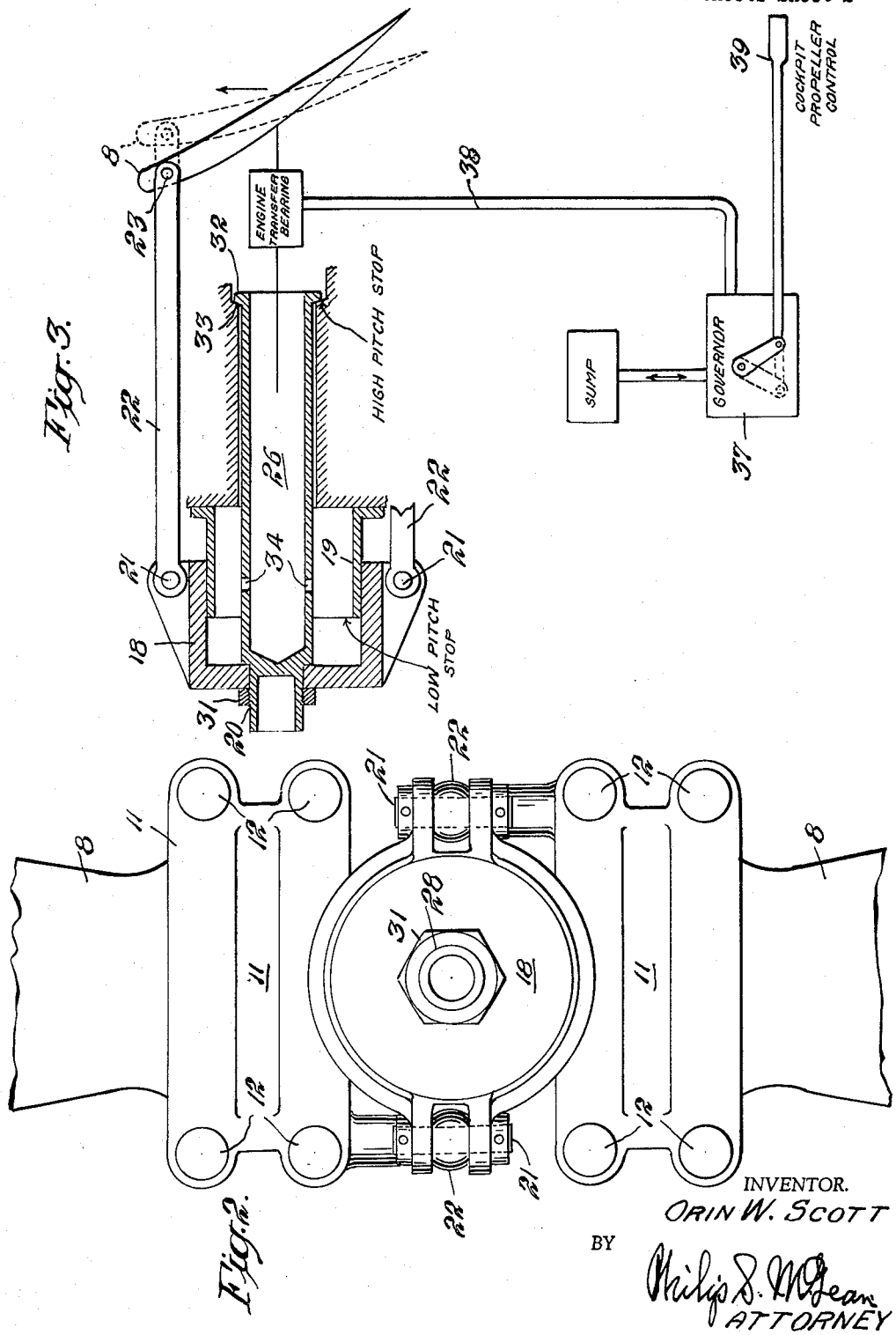

United States Patent Office 2,954,831
Patented Oct. 4, 1960

2,954,831
VARIABLE PITCH PROPELLER

Orin W. Scott, Wichita, Kans., assignor to Beech Aircraft Corporation, Wichita, Kans., a corporation of Delaware Filed Dec. 11, 1958, Ser. No. 779,714

1 Claim. (Cl. 170—160.32)

The invention herein disclosed relates to propellers of variable pitch design and objects of the invention generally are to provide such a propeller in a simple, few part, low cost, dependable and reliable form of construction.

Special objects of the invention are to provide the pitch control mechanism in a small size self-contained unit readily embodied in the hub of the propeller.

These objects have been attained by a novel arrangement of stationary piston and movable cylinder at the forward end of the hub with the cylinder connected with the propeller blades by drag links and provided with a central tube extending back through the piston and hub and providing both a guide for the cylinder and a conduit for the fluid governing the pitch of the blades.

Other desirable objects accomplished by the invention and further novel features of construction, combination and arrangement of parts are set forth and will appear in the course of the following specification.

The drawings accompanying and forming part of the specification are illustrative of a present practical embodiment of the invention, but it will be understood that structure and arrangement may be modified and changed as regards such illustration, all within the true intent and scope of the invention as hereinafter defined and claimed.

Fig. 1 in the drawings is a broken longitudinal sectional view of the hub portion of a propeller having the invention incorporated therein. In this view, the section is taken on planes to show the inner end of one blade, the blade at the top and a longitudinal section of the blade at the bottom.

Fig. 2 is a broken front end elevation of the same.

Fig. 3 is a part sectional diagrammatic view of the control mechanism.

Figure 1:
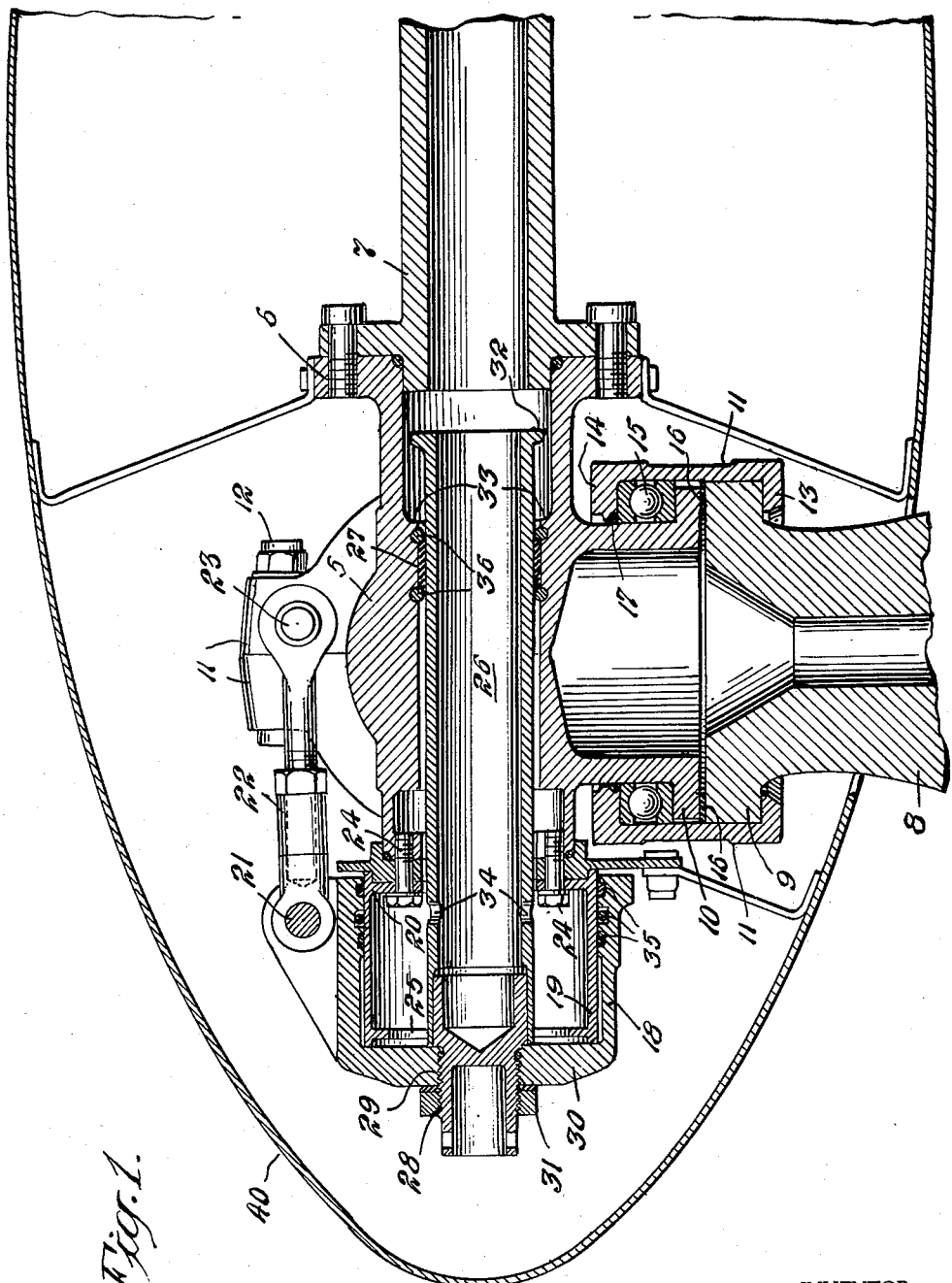

In Fig. 1, the hub portion of a propeller is indicated at 5, having a flange connection at 6, with the propeller or engine shaft 7. This shaft is of hollow construction, providing a supply passage for the oil used for control purposes.

The blades are indicated at 8, having flanges 9, at their base ends held by split clamps to the flanges 10, on the hub. As shown in Fig. 1, these clamps are made up of halves 11, bolted together at 12, and having flanges 13, at their outer edges engaged over the blade flanges 9, and flanges 14, at their inner edges engaged over ball bearings 15, in engagement with the hub flanges 10.

Spacing washers 16, between the opposing flanges 9 and 10 of the blades and hub determine the working freedom between these parts and O-rings 17, between the split clamps and hub structure prevent loss of lubricant from the ball bearings.

The blade adjusting mechanism comprises a movable cylinder 18, mounted to slide over the extended skirt portion 19, of a stationary piston 20, and carrying pivot pins 21, for adjustable links 22, connected with the pivot studs 23, on the split clamps.

The cupped or skirted piston 20, is shown secured by bolts 24, to the forward end of the hub.

The forward end of the piston skirt is shown internally reinforced by an annular rib 25, to form a firm bearing and support for the movable cylinder.

The cylinder is shown as carrying a center tube 26, extending back through the piston and hub and having a sliding bearing at the inner end in the hub at 27.

This tube is shown as having an adjustable connection with the cylinder by having a screw stud 28, at its forward end adjustably engaged in screw seat 29, in the front wall or head 30 of the cylinder. A lock nut 31, secures the screw stud and hence the center tube in longitudinally adjustable relation in the cylinder.

The purpose of the adjustment described is to regulate the position of the stop flange 32, at the inner end of the tube in respect to an annular stop shoulder 33, at the inner end of the center passage through the hub.

These stop shoulders 32, 33, determine the forward, high pitch movement of the control cylinder. Thus it will be seen that by a simple external adjustment of screw stud 28, in cylinder 18, the high pitch movement of the control mechanism can be quickly determined.

Flow of hydraulic actuating fluid through the hollow drive shaft 7, and center tube 26, into and out of the cylinder space in front of the stationary piston 20, is by way of a port or ports 34, in the tube.

The cylinder is shown as carrying suitable packing 35, riding over the annular forward extension or skirt 19, of the stationary piston.

The bearing 27, for the inner end of the center tube may be a plain slide bearing held in place by snap rings 36, or equivalent.

The blades are balanced or counter-balanced, so that the natural twisting moment of rotation applies tension in the links 22, tending to hold cylinder 18 inward, in the position shown in Fig. 1, against the forward end of the piston skirt 19.

Governor oil pressure which may be derived from a conventional fly-weighted aircraft hydraulic governor creates oil pressure in the hollow crank shaft and through center tube 26, and ports 34, pressure within the hollow piston to force cylinder 18, forward in a pitch increasing direction opposed to the twisting moment of the blades.

With governor controlling pressure on the cylinder, constant speed propeller operation can be maintained or the two fixed pitch positions may be determined by the stops 32, 33, for the forward high pitch position and engagement of the cylinder head with the forward end of the piston skirt for low pitch setting.

Loads from the blades are transferred from the blades to split clamps 11, which take the shear and centrifugal loads directly. Bending is carried as a difference of centrifugal loading around the split clamps and consequently around the flanges 10, of the hub. This eliminates the need of shear and bearing tubes heretofore considered necessary, simplifying structure and parts to that extent.

Fig. 1 shows the control mechanism in the retracted low pitch adjustment with the cylinder back against the end of the piston skirt, while Fig. 3 shows the cylinder in the forward position with the center tube stopped against the inner end of the hub passage in the high pitch position.

In the latter view also, the engine or propeller driven governor is indicated at 37, connected by oil line 38, with the hollow shaft and provided with cockpit control 39, for desired normal operating speed.

The center tube serves to partially support as well as to guide the cylinder and in addition to forming a conduit for the hydraulic pressure fluid provides a stop limiting the high pitch blade adjustment. This construction assures straight line movement of the cylinder.

The parts are few in number and compactly arranged and require but small space in the hub and at the front end of the hub, permitting use of a small closely surrounding spinner such as indicated at 40.

This construction and arrangement also permits use of short connecting links between the cylinder and blades, the mounting of the pivot studs 23 on the split blade clamps contributing to this effect.

The component parts are of simple form and can be produced at low cost and the entire mechanism constitutes a unit readily incorporated in the hub structure.

What is claimed is:

A variable pitch propeller comprising the combination of a propeller hub, blades rotatably mounted on said hub, a stationary piston on the forward end of said hub having a forwardly projecting skirt open at the front end of the same, a movable cylinder slidingly engaged over said skirt, connecting links extending from said movable cylinder back to said rotatably adjustable blades, said cylinder having a closed cylinder head engageable with the forward end of said piston skirt to limit the inward movement of the cylinder over said skirt and said blades being balanced in rotation toward low pitch position and thereby arranged in rotation to draw said cylinder inwardly to a stopped, low pitch position of the blades, a center tube extended from said movable cylinder back through said piston and hub and provided with a stop flange at the inner end of the same, an opposed stop shoulder at the inner end of said hub positioned for engagement by said stop flange to limit outward movement of said tube and cylinder toward the high pitch position of the blades, said center tube having a port in the forward end portion of the same opening into the space within the skirt of said piston to thereby admit actuating fluid within the skirt into pressure applying action against the head of the cylinder closing the forward open end of the skirt for adjustment of the blades toward high pitch position, said center tube having a screw mounting in said cylinder head and means for adjusting the screw mounting of the center tube in said cylinder head to adjust the relation of said stop flange in respect to said stop shoulder whereby to determine the extent of the high pitch adjustment of the blades.

References Cited in the file of this patent

UNITED STATES PATENTS

| | | |
|---|---|---|
| 1,951,321 | Blanchard | Mar. 13, 1934 |
| 2,248,590 | Smith | July 8, 1941 |
| 2,343,416 | Keller | Mar. 7, 1944 |
| 2,368,950 | Thomas | Feb. 6, 1945 |
| 2,578,350 | Greene | Dec. 11, 1951 |
| 2,722,985 | Biermann | Nov. 8, 1955 |